Dec. 13, 1927.
W. N. BOOTH
1,652,161
DEMOUNTABLE RIM TOOL
Filed April 29. 1922
2 Sheets-Sheet 1
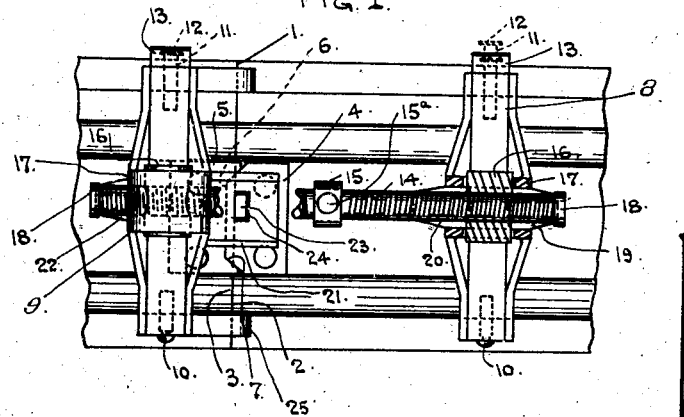
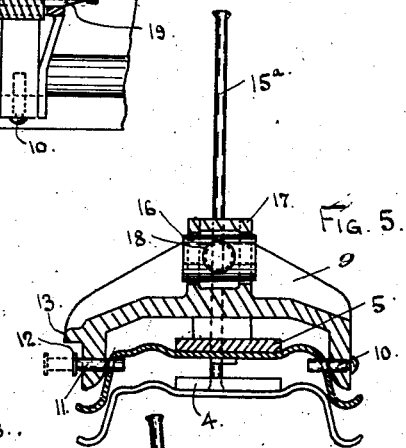
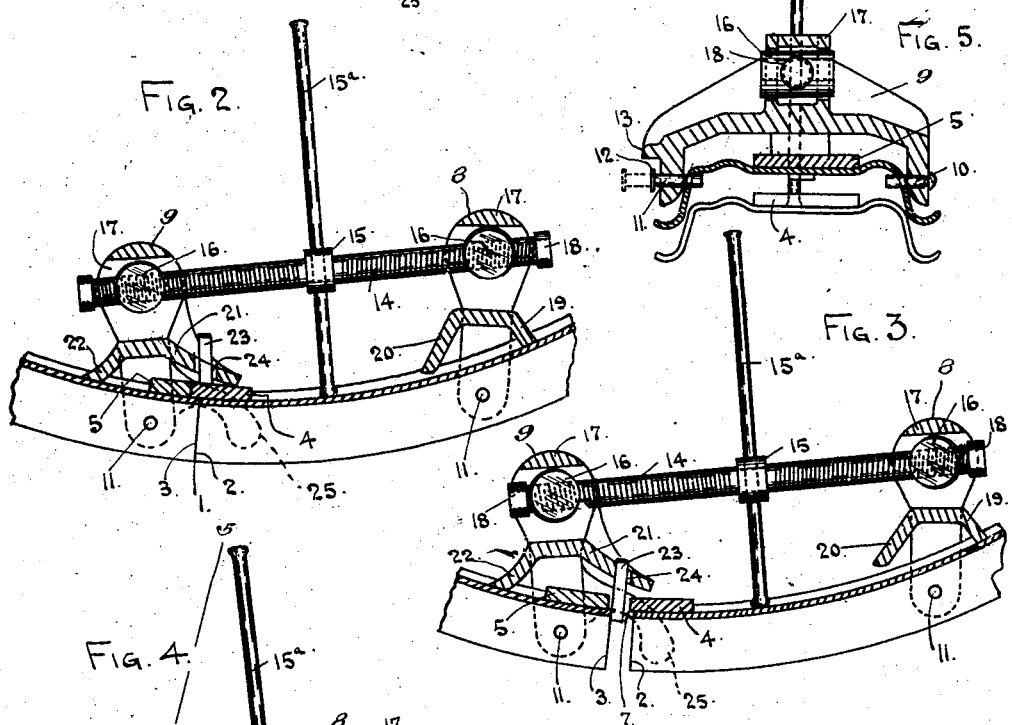
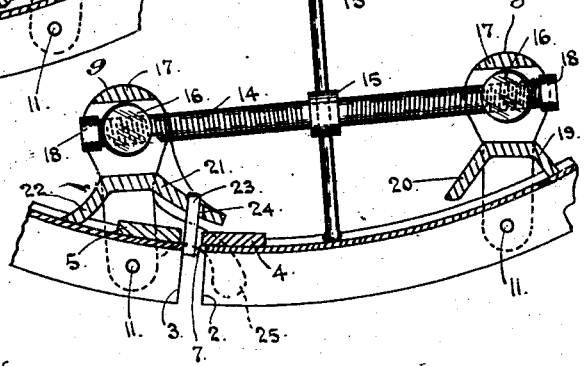
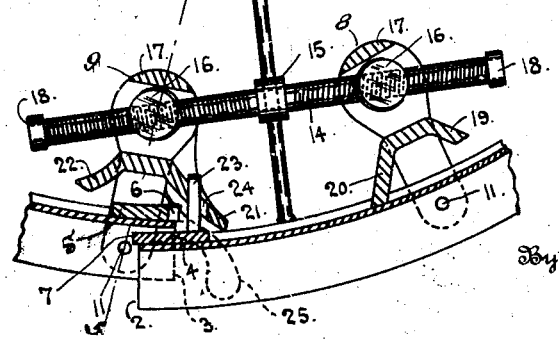
Inventor
WILLIAM. N. BOOTH.
Attorneys Dec. 13, 1927.
W. N. BOOTH
1,652,161
DEMOUNTABLE RIM TOOL
Filed April 29, 1922
2 Sheets-Sheet 2
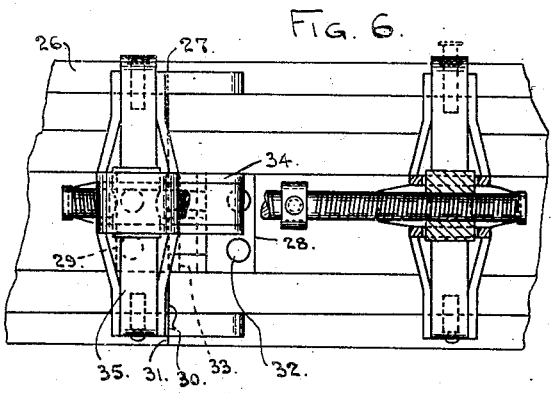
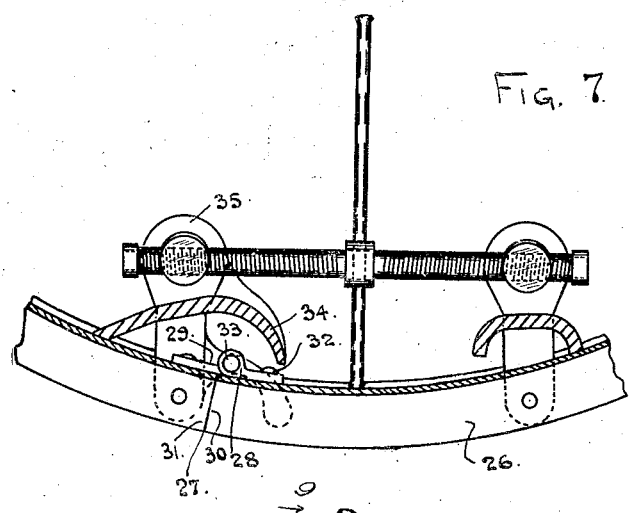
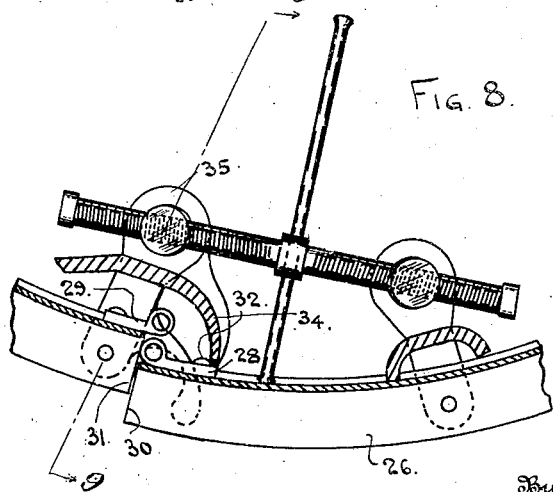
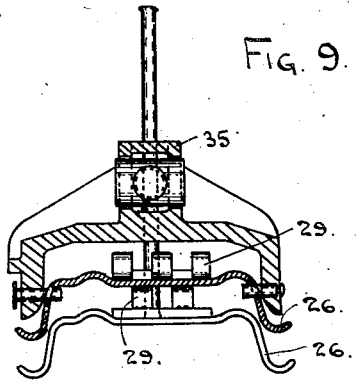
Inventor
WILLIAM. N. BOOTH.
Attorneys.

Patented Dec. 13, 1927.

1,652,161

UNITED STATES PATENT OFFICE.

WILLIAM N. BOOTH, OF DETROIT, MICHIGAN.

DEMOUNTABLE-RIM TOOL.

Application filed April 29, 1922. Serial No. 557,323.

The invention relates to devices for use in contracting and expanding rims particularly of the demountable type, and it has for one of its objects, the provision of a simple device which is readily attachable to or detachable from a rim, and which is adapted to readily separate the ends of the rim and to contract the rim sufficiently to apply or remove a tire. Another object is the provision of a device having yokes pivotally connected to the rim ends and provided with means engageable with the rim for limiting the rotation of the yokes relative to the rim ends. A further object is the provision of means upon one of the yokes for guiding the rim ends with respect to each other during their relative movements. Other objects of the invention reside in the novel features of construction and combinations and arrangements of parts as more fully hereinafter set forth.

In the drawings:

Figure 1 is a plan view of a portion of a demountable rim with the tool applied, for contracting and expanding the rim, this tool being shown partly in section;

Figure 2 is a side elevation thereof;

Figures 3 and 4 are longitudinal sections therethrough showing the parts in different adjusted positions;

Figure 5 is a cross section on the line 5—5 of Figure 4;

Figure 6 is a plan view of a portion of a modified demountable rim with a modified tool applied and shown partly in section;

Figure 7 is a sectional side elevation thereof;

Figure 8 is a similar view showing the rim in a partially contracted position with the tool in adjusted position for effecting the rim adjustment;

Figure 9 is a cross section on the line 9—9 of Figure 8.

The demountable rim is transversely split at 1 to form the two abutting ends 2 and 3 to which are secured cooperating plates 4 and 5 respectively. The plate 5 slightly overlaps the base of the rim end 2 and has the recess 6 engaged in by the tongue 7 upon the plate 4, this tongue slightly overlapping the base of the rim end 3.

8 and 9 are cooperating yokes of the rim tool, which respectively embrace the rim ends 2 and 3 and are secured thereto by means of the fixed pins 10 at one of their ends, and the slidable pins 11 at the other of their ends, these pins engaging in transversely aligned apertures in the side flanges of the rim. The slidable pins 11 have heads 12 at their outer ends for facilitating their adjustment into and out of the apertures in the rim, and the outer ends of these pins are protected by means of extensions 13 upon the ends of the yokes 8 and 9. 14 is a rod having right and left threaded ends and an intermediate enlargement 15 through which slidably extends a transverse rod 15ª. This rod threadedly extends through the cylindrical nuts 16 journalled in the bifurcations 17 extending outwardly from the bases of the yokes 8 and 9, and this threaded rod also preferably has the enlargements 18 at its ends for preventing disengagement from the cylindrical nuts.

The yoke 8 has the diverging lugs 19 and 20 extending inwardly toward the rim end 2 and adapted to alternatively engage its base, these lugs being adapted to limit the rotation of the yoke 8 about its pins 10 and 11 and relative to the rim end 2. The yoke 9 has the diverging lugs 21 and 22 extending inwardly toward the rim, the lug 21 being adapted to engage the plate 4 upon the rim end 2, and the lug 22 being adapted to engage the base of the rim end 3.

In order to contract the rim, its ends must be first separated and then brought into overlapping position. This is accomplished by first rotating the threaded member 14 to move the yokes 8 and 9 away from each other, bringing the lug 19 of the yoke 8 and the lug 22 of the yoke 9 into engagement with the rim to limit the relative rotation of the yokes and rim. The rotation of the threaded member is continued to separate the ends of the rim a sufficient distance to permit the spacing plate 23 slidably engaging in the aperture 24 of the lug 21 to engage between the cooperating edges of the plates 4 and 5. This spacing plate has enlarged ends to prevent its becoming disengaged from the lug carrying the same. Rotation of the threaded member 14, then in the opposite direction, moves the yokes 8 and 9 toward each other to bring their lugs 20 and 21 respectively into engagement with the rim, thereby limiting the relative rotation of the yokes and rim. Upon continued rotation of this threaded member, the rim end 3 is moved radially inward relative to the rim end 2, the spacing plate 23 holding the ends of the rim separated sufficiently so that the plates upon either rim end do not overlap the other rim end. This inward radial movement of the rim end 3 is accomplished by the yoke 9 fulcruming about the end of the lug 21. After the rim end 3 has been moved radially inward a sufficient distance, it will then slide over the inner face of the rim end 2 and overlap the same, the diameter of the rim being contracted the desired amount to readily remove or apply a tire. Rotation of the threaded member 14 in the opposite direction then through the yokes 8 and 9, expands the rim to bring its ends into re-engagement with each other, after which the tire tool may be removed by first disengaging the slidable pins 11 from the rim and afterwards disengaging the fixed pins 10 therefrom.

Another important feature of my invention resides in maintaining the side flanges of the rim ends 2 and 3 in alignment and preventing lateral movement of one rim end relative to the other during their relative radial movements. Specifically, I have provided the parallel lugs 25 upon the ends of the yoke 9 and engageable with the side flanges of the rim end 2.

In the modified construction shown in Figures 6, 7, 8 and 9, the demountable rim 26 transversely split at 27 has the hinge members 28 and 29, the main bodies of which are secured to the bases of the rim ends 30 and 31 respectively by suitable means such as the rivets 32, the barrels of these hinge members registering and being adapted for engagement in by a pin 33.

The rim tool for contracting and expanding this type of rim is of the same general construction as that shown in Figures 1 to 5 inclusive with the exception that the plate for holding the ends of the rim spaced is omitted, and also with the exception that the fulcrum lug 34 upon the yoke 35 adjacent to the split in the rim and secured to the rim end 31 is curved to extend over the barrels of the hinge members to provide clearance therefor at all times. The end of this fulcrum lug is recessed to engage over one of the rivet heads 32 securing the main body of the hinge member 28 to the rim end 30. In operation, with this tool, the threaded member between the yokes is rotated to adjust the yokes toward each other, thereby moving the rim end 31 radially inward relative to the rim end 30 using the lug 34 as a fulcrum. After the rim has been contracted sufficiently to permit of removing and applying a tire, the threaded member is then rotated in a reverse direction to again bring the rim ends into engagement with each other, and to permit of re-engagement with the pin 33 in the barrels of the hinge members.

What I claim as my invention is:

1. A rim tool comprising a member secured to one end of the rim, a member connected to the other end of the rim and having a fulcrum lug rigid therewith and adapted to engage the first-mentioned end of the rim, means for moving said members toward each other, and cooperating means on said rim and member for positioning said second member, whereby said fulcrum lug will engage the first-mentioned end of the rim.

2. A rim tool comprising a yoke secured to one end of the rim, a yoke pivotally connected to the other end of the rim and having a fulcrum lug extending inwardly from its base and adapted to engage the first-mentioned end of the rim and cooperating means on said rim and second yoke for mounting said second yoke whereby said fulcrum lug may engage the first-mentioned end of said rim and means for moving said yokes toward each other to bring said fulcrum lug into engagement with the first-mentioned end of the rim and to contract the rim.

3. A rim tool comprising members secured to the ends of a rim and movable toward each other, of fixed means upon one of said members, and cooperating means on said rim and member for mounting said member whereby said fixed means is engageable with the other end of the rim for radially moving the ends of the rim relative to each other, when said members are moved toward each other.

4. A rim tool comprising members secured to the ends of a rim and movable toward each other, of fixed means upon one of said members engageable with the other end of the rim for radially moving the ends of the rim relative to each other, and means for guiding the ends of the rim during their relative radial movements.

5. A tool for a transversely split rim comprising a yoke secured to one of the rim ends, a second yoke secured to the other of the rim ends, a fulcrum lug rigidly carried by said second yoke and engageable with the first-mentioned rim end, and a lug upon one of said yokes engageable with the other rim end for guiding the same during the relative radial movements of the rim ends.

6. A tool for a transversely split rim comprising a yoke secured to one of the rim ends, a second yoke pivotally secured to the other rim ends, a fulcrum lug rigidly mounted upon said second yoke engageable with the first-mentioned rim end, substantially parallel lugs upon said second yoke engageable with the sides of the first-mentioned rim end for guiding the rim ends with respect to each other during their relative radial movements.

7. In a rim tool for a transversely split rim having overlapping positioning plates at its ends, the combination with members secured to the rim ends, of means for moving said members toward and away from each other, means upon one of said members for holding the positioning plates spaced to be out of overlapping position, and means upon one of said members for radially moving the rim ends relative to each other while the positioning plates are held spaced.

8. In a tool for a transversely split rim having overlapping positioning plates, the combination with a yoke secured to one of the rim ends, a second yoke pivotally secured to the other of the rim ends, a fulcrum lug upon said second yoke for engagement with the first-mentioned rim end, a member carried by said second yoke engageable between the edges of the positioning plates upon the rim for spacing the same out of overlapping position, and means for moving said yokes toward and away from each other.

9. In a rim tool, comprising a yoke embracing a rim end, means for pivotally securing said yoke to the rim end, diverging lugs upon said yoke extending inwardly toward and engageable with the rim ends to limit the rotation of said yoke relative to the rim end, a second yoke embracing the other rim end, means for pivotally connecting said second yoke to the other rim end, diverging lugs upon said second yoke extending inwardly toward the rim, one of said lugs being engageable with the first-mentioned rim end and the other of said lugs being engageable with the last-mentioned rim end, and means for moving said yokes toward and away from each other, and means on said rim for positioning said second yoke so that its last-mentioned lug will engage the last-mentioned rim end.

In testimony whereof I affix my signature.

WILLIAM N. BOOTH.